No. 632,171. Patented Aug. 29, 1899.
H. J. BOLINSKI.
STOCK FEEDER AND WATERER.
(Application filed Nov. 7, 1898.)
(No Model.) 2 Sheets—Sheet 2.
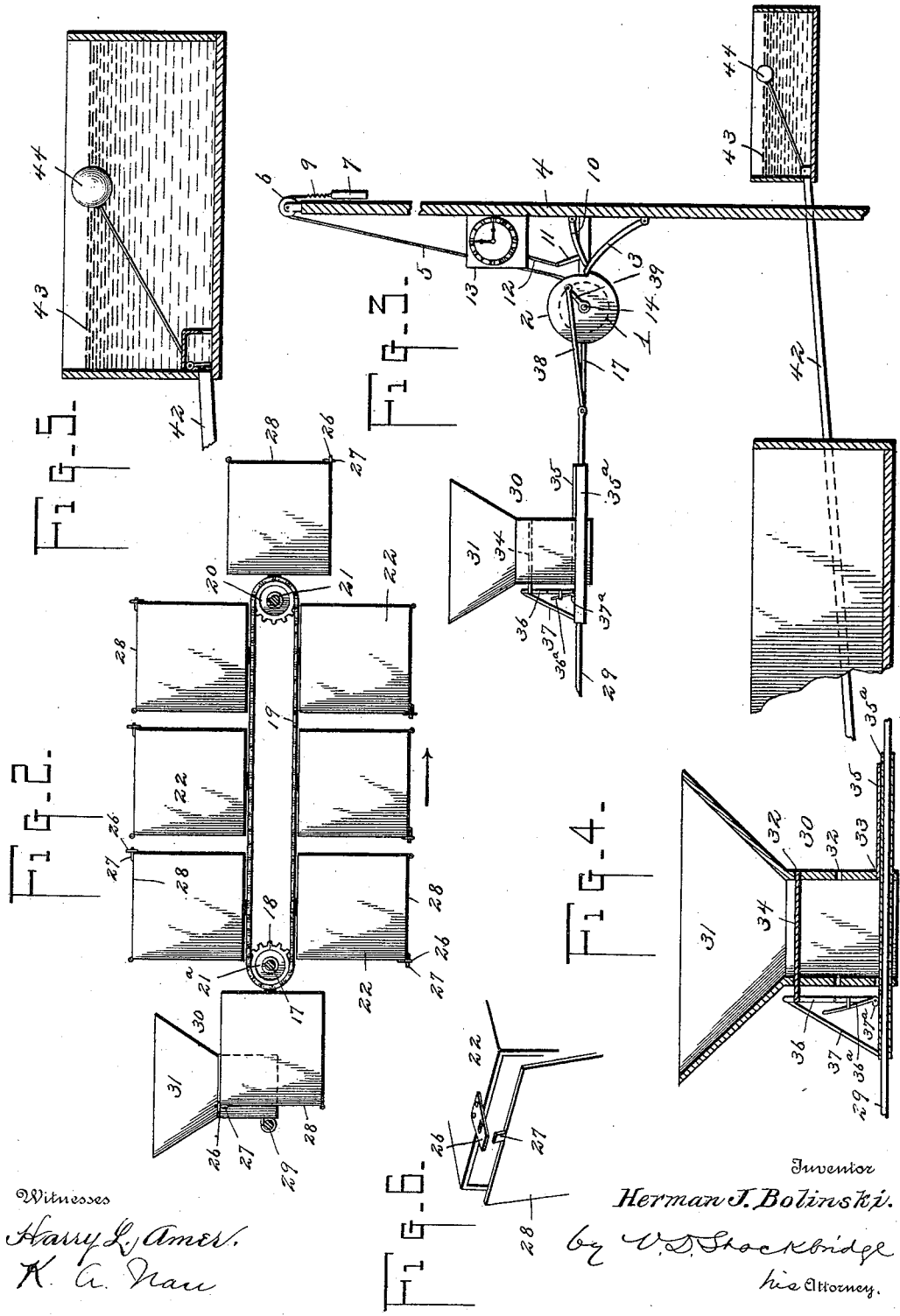
Witnesses
Harry L. Amer.
K. A. Nau
Inventor
Herman J. Bolinski.
by V. D. Stockbridge
his Attorney.

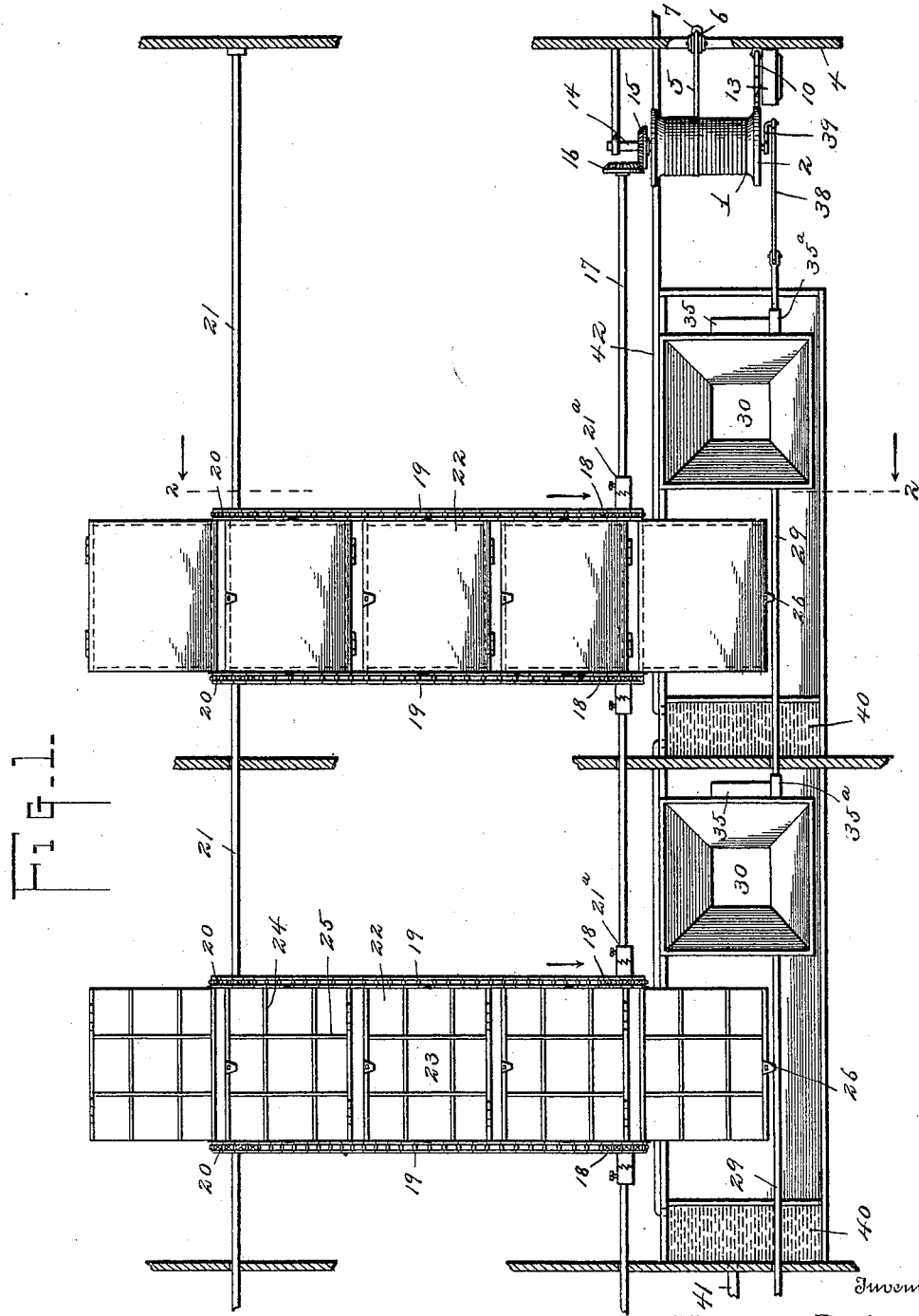

UNITED STATES PATENT OFFICE.

HERMAN J. BOLINSKI, OF NEW LONDON, WISCONSIN.

STOCK FEEDER AND WATERER.

SPECIFICATION forming part of Letters Patent No. 632,171, dated August 29, 1899.

Application filed November 7, 1898. Serial No. 695,728. (No model.)

*To all whom it may concern:*

Be it known that I, HERMAN J. BOLINSKI, a citizen of the United States, residing at New London, in the county of Waupaca and State of Wisconsin, have invented certain new and useful Improvements in Stock Feeders and Waterers; and I do hereby declare the following to be a full, clear, and exact description of the invention, such as will enable others skilled in the art to which it appertains to make and use the same.

This invention relates to stock feeders and waterers, the object of the same being to provide means whereby cut feed, grain or hay, and water may be automatically delivered to horses or cattle in their stalls at predetermined intervals without the necessity of the presence of an attendant.

The invention consists of the construction, combinations, and arrangements of parts hereinafter described and claimed.

In the drawings forming a part of this specification, Figure 1 is a plan view, partly in section, illustrative of my invention. Fig. 2 is a section on the line 2 2 of Fig. 1. Fig. 3 is a detail vertical sectional view showing one of the feed-hoppers and the motor in front elevation. Fig. 4 is a detail sectional view, on an enlarged scale, of one of the feed-hoppers. Fig. 5 is a detail sectional view of the water-tank, and Fig. 6 is a detail perspective view of a portion of one of the feed-boxes.

Like reference-numerals indicate like parts in all the views.

In carrying out my invention I employ a motor consisting of a drum or spool 1, having a notched or shouldered flange 2 at one end, with which is adapted to engage a gravity-pawl 3, fulcrumed to a post or other stationary support 4, which pawl is almost, but not quite, capable of resisting the movement of said drum. Wound upon the drum is an actuating-cord 5, which passes up and around a sheave or pulley 6 in the upper end of the post 4 and has connected to it a weight 7, between which and said cord is an interposed spring 9, designed to prevent jarring of the machine by the sudden movement of the weight. The said cord is adapted to reel off the drum 1 from the side thereof adjacent to the post 4, and through it and the weight described the drum 1 is normally held under tension, its movement being resisted by the pawl 3, heretofore referred to, and a dog 10, fulcrumed to the post 4 and adapted to engage the pawl 3 for holding the latter in close contact with the shouldered flange 2. The dog 10 is also gravity-actuated and is connected through a link 11 and cord 12 with the alarm mechanism of a clock 13. The said clock may be set to actuate its alarm at any predetermined hour, and in so doing it elevates the dog 10, thereby releasing the pawl 3 and permitting of the rotation of the drum 1. The said drum is secured to a shaft 14, upon one end of which is mounted a beveled cog-wheel 15, meshing with a beveled pinion 16 upon one end of a horizontal shaft 17. The shaft 17 extends transversely through the stable adjacent to the forward ends of the stalls therein and has loose upon it opposite each stall a pair of sprocket-wheels 18 18, around which pass the sprocket-chains 19 19, which are also geared to sprocket-wheels 20 upon a transverse shaft 21. The said sprocket-wheels 18 are adapted to be made fast to the shaft 17 by means of the clutches $21^a$, which have a spline-and-feather connection with said shaft. (See Figs. 1 and 2.) This clutch mechanism is provided for the purpose of enabling the conveyers in one or more of the stalls to be thrown into and out of operative connection with the shaft 17, according to whether the stall is occupied or not.

The chains 19 are arranged in pairs and constitute conveyers for the feed-boxes 22, which are connected therewith. The said boxes may be made up of a frame 23, consisting of parallel horizontal bars 24, connected by wires 25 25, or the same may be made of tin or other sheet metal, according to the kind of feed to be carried thereby. The feed-boxes are pivotally connected to the chains 19 19, and the upper front edge of each has secured to it at a point intermediate of its ends a perforated spring-tongue 26, which constitutes a keeper for a catch 27, projecting from the forward edge of the cover 28, the said cover being pivoted at its inner ends to the box. The projecting tongues or keepers 26 are adapted to engage in succession a transversely-extending rod or bar 29, located in front of the shaft 17. In so doing they are sprung away from the catches 27, the covers are released and opened, and the contents of the boxes are discharged into the manger.

In connection with the foregoing parts I employ in each stall a grain-hopper 30, having a chute 31 upon its upper end and provided with a plurality of horizontally-arranged slots 32 33, in which fit and are adapted to move cut-off slides 34 35. The slide 34 is adapted to be inserted into one or the other of the slots 32, whereas the slide 35 fits and moves at all times within the slot 33, the object of the adjustment of the slide 34 being to enable any desired quantity of grain to be fed from the hopper into the trough or manger. The slide 34 is connected to a loosely-mounted sleeve 35ª by means of an upright or standard 36 and a bracing-rod 37. The slide 35 is connected directly to the sleeve 35ª and is located just in advance of the slide 34, so that when the latter is within the hopper, closing the same, the former will be outside of it—that is to say, the slides 34 and 35 are arranged upon the sleeve 35ª, so that upon the reciprocation of said sleeve a predetermined quantity of grain from the chute 31 may be fed into the hopper upon the slide 35 and afterward discharged therefrom without admitting an additional quantity thereto by the movement of the slide 34. The rod 29, heretofore referred to, passes loosely through the sleeve 35ª and is adapted to be rigidly connected to the same by means of a clutch consisting of a lever 36ª, fulcrumed to the standard 36 and having a cam or eccentric 37ª upon its lower end, which is adapted to be projected through a slot in the sleeve 35ª in the manner clearly illustrated in Fig. 4 of the drawings. By this construction the slides may be connected to or disconnected from the rod 29 at will, so that they need be in operation only when the stall is occupied and it is desired to supply feed to the manger therein. The rod 29, which operates the slides 34 and 35, is connected through a link or pitman 38 with a crank 39 upon the end of the shaft on which the drum 1 is mounted. It will therefore be seen that when the dog 10 is elevated through the actuation of the alarm mechanism of the clock 13 the pawl 3 will be released from its engagement with the shouldered flange 2 of the drum 1, and the latter will be turned one revolution through the medium of the weight 7, which is connected to the free end of the cord 5. During this revolution of the drum the conveyers 19 19 will be moved through the agency of the cog-wheel 15, pinion 16, shaft 17, and sprocket-wheels 18, to which the sprocket-chains 19 are directly connected. This movement of the conveyers will bring one of the feed-boxes to its forward position and through the means described release the cover 28 thereof and discharge the contents of said box into the trough or manger. At the same time a predetermined quantity of grain will be discharged from the hopper 30 by the actuation of the cut-off slides 34 and 35, directly connected to the rod 29, operated by the drum 1.

The water-trough 40, which may be located in the front or at one side of each of the stalls, is provided at 41 with an overflow-pipe for drawing off any excess of water that may at any time be admitted to the trough. The said trough is further connected, by means of a pipe 42, with a tank 43, similar in construction to an ordinary flush-tank, and provided with a float 44, which controls the supply of water from the tank. The valve controlling the outlet of water from the tank to the pipe 42 is designed in practice to be connected with a clock mechanism and to be operated automatically thereby in a manner similar to the operation of the feed mechanism described; but it may be operated by a float or in any other suitable manner.

Having thus described my invention, what I claim as new, and desire to secure by Letters Patent, is—

1. In apparatus for feeding stock, the combination with a shaft and a motor for rotating the same, of sprocket-wheels on said shaft, a counter-shaft, sprocket-wheels thereon, sprocket-chains connecting the sprocket-wheels on said shafts, feed-boxes connected to said chains and provided with perforated spring-tongues constituting keepers, pivoted lids or covers for said boxes, projecting catches on said lids coöperating with said keepers, and engaging means for said keepers adapted to disconnect the same from said catches, release the lids or covers, and permit of the discharge of the contents of the boxes therefrom.

2. The combination with a rotary part of a motor having a shoulder thereon, of a pawl adapted to engage said shoulder, and a dog for locking said pawl in engagement with said shoulder.

3. The combination with a rotary part of a motor having a shoulder thereon, of a pawl adapted to engage said shoulder of insufficient power to resist the movement of said rotary part, and a dog engaging said pawl for holding the latter in engagement with said shoulder, as and for the purpose set forth.

4. The combination with a shaft, of a motor for rotating said shaft, consisting of a drum having a shouldered flange thereon, a cord wound upon said drum and having a weight upon its free end for operating said drum, detent mechanism for said drum, consisting of a pivotally-mounted pawl adapted to engage the shouldered flange on said drum, and a dog for holding said pawl in contact with said flange, and clock mechanism for automatically tripping said dog.

5. In an apparatus for feeding stock, the combination of a drum having a shouldered flange thereon, a cord wound upon said drum, a weight upon the end of said cord, detent mechanism for said drum, clock mechanism for automatically releasing said detent mechanism, a shaft operatively connected with said drum and adapted to be rotated thereby, sprocket-wheels on said shaft, a counter-shaft, sprocket-wheels thereon, sprocket-chains connecting the sprocket-wheels on said shafts, feed-boxes carried by said chains, pivoted covers for said feed-boxes provided with projecting catches, spring-keepers for receiving said catches, a reciprocating rod adapted to be engaged by said keepers for disengaging said lids or covers and discharging the contents of said boxes, a feed-hopper, upper and lower cut-off slides for controlling said hopper, the said slides being carried by said reciprocating rod and so constructed and arranged that when one is open the other is closed, a crank upon the lower end of the shaft upon which said drum is mounted, and connections between said crank and said reciprocating rod, as and for the purpose set forth.

In testimony whereof I affix my signature in presence of two witnesses.

HERMAN J. BOLINSKI.

Witnesses:
F. J. FEENEY,
W. C. LAMBERT.